(12) United States Patent
Bernt et al.

(10) Patent No.: US 11,261,349 B2
(45) Date of Patent: Mar. 1, 2022

(54) METHOD FOR MOLDING A BODY IN A MOLD

(71) Applicant: TESA SE, Norderstedt (DE)

(72) Inventors: Stephan Bernt, Hamburg (DE); Patrick Kerep, Hamburg (DE)

(73) Assignee: tesa SE, Norderstedt (DE)

( * ) Notice: Subject to any disclaimer, the term of this patent is extended or adjusted under 35 U.S.C. 154(b) by 55 days.

(21) Appl. No.: 15/578,137

(22) PCT Filed: Jul. 14, 2016

(86) PCT No.: PCT/EP2016/066703
§ 371 (c)(1),
(2) Date: Nov. 29, 2017

(87) PCT Pub. No.: WO2017/012962
PCT Pub. Date: Jan. 26, 2017

(65) Prior Publication Data
US 2018/0148610 A1 May 31, 2018

(30) Foreign Application Priority Data

Jul. 17, 2015 (DE) .................... 10 2015 213 507.1

(51) Int. Cl.
*C09J 7/29* (2018.01)
*B29C 70/54* (2006.01)
*B29C 33/60* (2006.01)

(52) U.S. Cl.
CPC ............... *C09J 7/29* (2018.01); *B29C 70/543* (2013.01); *B29C 33/60* (2013.01); *C09J 2400/10* (2013.01);
(Continued)

(58) Field of Classification Search
CPC .................... C09J 7/29; B29C 70/543
(Continued)

(56) References Cited

U.S. PATENT DOCUMENTS 2,617,126 A * 11/1952 Nebesar ............... B63B 5/24
114/357
2,989,419 A * 6/1961 Lamason ............... C09J 7/50
428/353
(Continued)

FOREIGN PATENT DOCUMENTS

CN 104471143 A 3/2015
DE 43 13 008 C1 11/1994
(Continued)

OTHER PUBLICATIONS

Machine Translation of WO 01/68364 (Year: 2001).*
(Continued)

*Primary Examiner* — Jacob T Minskey
*Assistant Examiner* — Russell E Sparks
(74) *Attorney, Agent, or Firm* — Norris McLaughlin PA (57) ABSTRACT

Adhesive tape having a carrier material comprising the following layers: a textile composed of fibers having a softening point greater than or equal to 200° C., and coated with fluoropolymers or silicone polymers, to the top side of which textile a first film composed of fluoropolymers is applied over the whole surface and to the bottom side of which textile a second film is applied over the whole surface, wherein a self-adhesive mass is applied to one side of the carrier material.

18 Claims, 3 Drawing Sheets

(52) U.S. Cl.
CPC .... *C09J 2400/143* (2013.01); *C09J 2400/263* (2013.01); *C09J 2427/006* (2013.01); *C09J 2483/00* (2013.01)

(58) Field of Classification Search
USPC ........................................................ 264/510
See application file for complete search history.

(56) References Cited

U.S. PATENT DOCUMENTS

| | | | | |
|---|---|---|---|---|
| 3,654,012 A * | 4/1972 | Schlager | ................. | B29C 51/16 |
| | | | | 156/212 |
| 3,884,722 A * | 5/1975 | Tucholski | ........... | H01M 2/1229 |
| | | | | 429/54 |
| 4,257,936 A * | 3/1981 | Matsumoto | ............. | C08L 83/04 |
| | | | | 524/413 |
| 4,772,230 A * | 9/1988 | Berg | ...................... | B29C 70/68 |
| | | | | 264/257 |
| 5,807,632 A * | 9/1998 | Pedginski | ............... | B32B 27/28 |
| | | | | 428/352 |
| 6,063,493 A * | 5/2000 | Saitou | ........................ | C09J 7/29 |
| | | | | 428/354 |
| 6,613,870 B1 | 9/2003 | Harder et al. | | |
| 7,851,535 B2 * | 12/2010 | Lu | ........................ | C09D 129/04 |
| | | | | 156/500 |
| 8,092,736 B2 * | 1/2012 | Moffett | ................... | B29C 33/62 |
| | | | | 264/300 |
| 2009/0274859 A1 * | 11/2009 | Husemann | .............. | B29C 48/18 |
| | | | | 428/41.8 |
| 2011/0104470 A1 * | 5/2011 | Anderson | ............ | C09D 183/04 |
| | | | | 428/221 |
| 2012/0312469 A1 | 12/2012 | Stiesdal | | |
| 2013/0337250 A1 | 12/2013 | Austin et al. | | |
| 2015/0035204 A1 * | 2/2015 | Stoner | ...................... | C09J 7/048 |
| | | | | 264/334 |
| 2015/0072580 A1 | 3/2015 | Watanabe et al. | | |
| 2016/0158971 A1 | 6/2016 | Bernt et al. | | |
| 2017/0210953 A1 | 7/2017 | Bernt et al. | | |

FOREIGN PATENT DOCUMENTS

| | | | | |
|---|---|---|---|---|
| DE | 10 2006 053 440 A1 | 6/2008 | | |
| DE | 2 388 131 A1 | 11/2011 | | |
| DE | 10 2013 221 847 A1 | 2/2015 | | |
| DE | 10 2014 215 079 A1 | 2/2016 | | |
| GB | 2178998 A * | 2/1987 | ........... | B29C 70/542 |
| WO | WO-0168364 A1 * | 9/2001 | ................ | C09J 7/38 |
| WO | 2013/181431 A1 | 12/2013 | | |
| WO | 2015/014646 A | 2/2015 | | |

OTHER PUBLICATIONS

Polyester Fiber, Textile Learner, https://web.archive.org/web/20140726013822/https://textilelearner.blogspot.com/2011/07/polyester-fiber-pet-physical-properties_9005.html (Year: 2011).*
Definition of Textile, Merriam-Webster Dictionary, https://www.merriam-webster.com/dictionary/textile (Year: 2020).*
Definition of Cloth, Merriam-Webster Dictionary, https://www.merriam-webster.com/dictionary/cloth (Year: 2020).*
Definition of Self-Adhesive, Merriam-Webster Dictionary, https://www.merriam-webster.com/dictionary/self-adhesive (Year: 2020).*
Merriam Webster Dictionary, Definition of Nonwoven, https://www.merriam-webster.com/dictionary/nonwoven (Year: 2020).*
"Handbook of Pressure Sensitive Adhesive Technology" by Donatas Satas (van Nostrand, 1989).
English Translation of International Search Report dated Sep. 20, 2016, dated Sep. 28, 2016.
International Search Report dated Sep. 20, 2016, dated Sep. 28, 2016.
Office Action dated Jan. 8, 2020, in connection with Chinese Patent Application No. 201680037585.1.
Translation of Second Office Action dated Sep. 18, 2020, and issued in connection with Chinese Patent Application No. 201680037585.1.

* cited by examiner

METHOD FOR MOLDING A BODY IN A MOLD

This is a 371 of PCT/EP2016/066703 filed 14 Jul. 2016, which claims foreign priority benefit under 35 U.S.C. 119 of German Patent Application 10 2015 213 507.1 filed Jul. 17, 2015.

The present invention relates to an adhesive tape and the use of the adhesive tape in a method for molding a body in a mold, in which method a body, in particular a half blade of a rotor which is installed in a wind turbine, is molded from a plurality of curable material layers.

BACKGROUND OF THE INVENTION

Many component parts, in part with complex geometrical structures, are produced by introducing curable material, such as epoxy or polyester resins, into a mold, and then curing the material.

Examples of processes of this kind are RTM (resin transfer molding) and VRTM (vacuum-assisted resin transfer molding). Resin transfer molding is a method for producing molded parts from thermosets and elastomers. Compared to compression molding, the molding mass is injected by means of plungers into the mold cavity via runners from an ante-chamber, which is usually heated, and the molding mass is cured in said mold cavity under application of heat and pressure. Formaldehyde resins (phenol resins or aminoplasts) and reactive resins (polyesters, such as PET, or epoxy resins) with small filler particles and elastomers can be used as molding mass.

At the start of a cycle, there is a pre-plasticized and metered molding mass arranged in the ante-chamber. The mold is firstly closed. The molding mass is then injected into the mold and is left in the mold for a certain period of time. During this time, which is known as the residence time, the molding mass reacts or vulcanizes. This is dependent on various factors (resin type, filler, processing pressure and temperature). Once the residence time has elapsed, the mold can be opened. The molding mass introduced previously is now solid (cured) and is now referred to as a molded part. It can now be removed from the mold. The mold is then cleaned, and a new cycle can start.

The amount of molding mass required for injection and subsequent compression should always be greater here than the volume of the final molded part, so that the mold is completely filled. It is thus guaranteed that the molded part is fully formed and that no air is injected. The excess molding mass left behind here in the ante-chamber, also referred to as residual cake, must be removed and replaced with new molding mass before the start of the new cycle.

In order to avoid air inclusions, the cavity (mold cavity) is usually additionally evacuated.

So as to also process long fibers or semi-finished fiber products (pre-wovens/preforms), these are laid beforehand in the mold and overmolded with the molding mass. Here as well, the cavity (mold cavity) is advantageously usually additionally evacuated.

The "pre-wovens methods" can be categorized in accordance with the number and design of the resin gates. The introduction of the resin into the semi-finished fiber product will be referred to hereinafter as injection, regardless of the way in which the pressure gradient is produced.

Point injection: The resin is injected into the semi-finished product only at one point. Air can be trapped in the flow front at the injection gate, which leads to defects.

Multi-point injection. The mold can be filled more quickly with resin due to the provision of a number of injection points. The inclusion of air can be prevented by clever positioning.

Line injection: In the case of line injection the resin is not injected at a single point, but instead linearly at the edge of the mold. This can be advantageous in the case of components that have an elongate extent, since the resin has to pass through only the shorter edge length.

Flow channel injection: The resin is injected through a wide channel, which is disposed above or below the semi-finished fiber product.

Cascade injection: In order to minimize the pressure gradients, a number of injection points are provided in the direction of the flow front. However, it is necessary for this purpose to open and close the injection lines following the flow front.

Solid molds, soft molds and mixed molds are known as mold types.

Resins that have low viscosity are used as injection resins. The flow resistance as the resin passes through the mold thus remains low, and smaller pressure differences are necessary for filling. Reactive resins for RTM methods are offered as special injection resins that consist of a resin component and hardener component. Low-reactivity resin systems can be mixed already prior to infusion. If high-reactivity resin systems are used, resin and hardener can be mixed directly in the infusion line or the mold. Lower cycle times are made possible in this way. Methods in which the injection resin components are mixed immediately prior to injection are known as RIM methods (reaction injection molding).

Further details can be found in Römpp's Chemistry Lexicon, more specifically under the headword "Spritzgießen" (injection molding) (2013 Georg Thieme Verlag, document identifier RD-19-03499, last update: July 2011).

In order to construct a body, for example the (half) blade of a rotor installed in a wind turbine, glass fiber mats are used, which are introduced as sublayers into a suitably shaped mold. The layers are then bonded with a resin and hardened in the mold in order to produce a fiber-reinforced polymer or a glass-fiber-reinforced plastic.

In order to ensure simple and destruction-free demolding, the mold, which constitutes the negative impression and as appropriate also the positive impression of the part to be constructed, must be prepared with an anti-adhesive material, which is applied to the mold before the layers are built up.

To this end, release agents are often used, such as polyvinyl alcohol or silicone wax. Release agents based on silane or siloxane are also known, for example the products from the FREKOTE® range from Henkel. Furthermore, PTFE-coated glass fiber fabric is used, which is applied to the mold in the form of an adhesive tape and replaces the release agent. The release agent is applied in a uniform layer, and this layer must be absolutely smooth so that the outer surface of the body is also smooth.

The liquid release agents used as standard are solvent-based and require a drying and curing time of 20 to 30 min in each case. The application of the release agent also takes 20 to 30 min.

Since the release agent has to be reapplied before each construction cycle depending on the application, there is thus a total dead time of 1.5 h prior to each construction cycle.

A further disadvantage is the fact that the release agents are transferred in part to the component, which hinders a direct subsequent further processing for example by lacquering. The release agent must firstly be removed, which also takes time.

It is also known that the release effect of release agents of this kind is not 100%. Due to the fact that the resin is in direct contact with the mold, a small amount of resin becomes deposited at some places after each further demolding cycle. This effect builds up to such an extent that the mold, depending on the degree of severity, has to be ground down and polished after 200 cycles, since otherwise it is no longer possible to guarantee the fit accuracy of the demolded components.

Some of the used release agents are based on organic solvents, which evaporate as they dry and load the ambient air. In certain cases, extra safety precautions have to be taken as a result in order to minimize the risk of fire or explosion.

A less widespread alternative lies in lining the component mold with PTFE-coated glass fiber fabric adhesive tapes. Depending on quality, these have to be replaced less frequently and offer a good release effect. This saves time above all, which can be used for further production cycles.

A disadvantage of the application process for the glass fiber fabric adhesive tape is the three-dimensional mold, because it must be ensured that as few irregularities as possible are produced, such as air bubbles beneath the adhesive tape, overlapping adhesive tape edges or folds.

This is hindered enormously by the rigidity and the lack of flexibility of the PTFE-treated glass fiber fabric carrier.

When producing a PTFE-coated glass fiber fabric, a very wide bale of glass fiber fabric is usually wetted with PTFE on the upper side and the lower side and is later cut into many rolls having the desired width. There is thus no PTFE at the cut edges of the rolls. This in turn means that the glass fiber fabric and therefore the adhesive tape becomes fully saturated with liquid resin in the mold, thus reducing the release effect and/or the number of cycles before a complete exchange of the tape is required.

There are large qualitative differences between the PTFE-treated glass fiber fabric carriers. It is virtually impossible to prevent what are known as micro tears in the PTFE layer, into which resin can penetrate. Depending on the quality, these tears occur to a greater or lesser extent. They cause the adhesive tape to become fully saturated with resin in its middle, which, as described in the paragraph above, leads to a reduction of the service life.

Furthermore, it is not possible to prevent the glass fiber fabric (or indeed any fabric) from fraying at the cut edges, with individual fibers protruding into the mold. When the component is demolded, this causes the fibers and (in part) the adhesive tape to be torn out. Once damage of this type has occurred once, it spreads quickly, so that the gap created must be patched. The edges newly created are also sensitive, and therefore this constitutes a progressively deteriorating process.

A glass fiber fabric adhesive tape coated with PTFE thus also loses its release effect little by little, so that it has to be replaced for example after 30 demolding operations.

The object of the present invention is to provide an adhesive tape which does not have the above-discussed disadvantages, which in particular has a carrier which cannot become fully saturated with resin and which does not fray, and which can be used accordingly advantageously in a method for molding a body formed of curable material layers in a mold.

This object is achieved by an adhesive tape as stipulated in the main claim. The dependent claims relate to advantageous developments of the subject matter of the invention. The invention also comprises the use of the adhesive tape.

SUMMARY OF THE INVENTION

The invention relates accordingly to an adhesive tape with a carrier material comprising the following layers:
   a textile composed of fibers having a softening point greater than or equal to 200° C., preferably 250° C., and coated with fluoropolymers or silicone polymers,
   to the top side of which textile a first film composed of fluoropolymers is applied over the whole surface, and
   to the bottom side of which textile a second film is applied over the whole surface,
wherein an adhesive mass, in particular a self-adhesive mass, is applied to one side of the carrier material.

The textile is preferably a non-woven fabric or particularly preferably a woven fabric.

In particular, carbon fibers or glass fibers are used as fibers.

A glass fiber fabric is particularly preferred.

Fluoropolymers are particularly preferably used for the coating.

In particular, a glass fiber fabric coated with fluoropolymers is particularly preferred.

The textile, preferably glass fiber fabric, is coated with fluoropolymers advantageously in accordance with a method known to a person skilled in the art as a dip-coating process. A textile/glass fiber fabric is then drawn through a fluoropolymer dispersion, in particular PTFE dispersion, which is then sintered. By passing the textile/glass fiber fabric numerous times through this dispersion, the fluoropolymer thickness can be increased and therefore the quality of the material can be improved.

In accordance with a preferred embodiment of the invention the yarns of the textile/glass fiber fabric are coated with fluoropolymers in a thickness of from 2 μm to 50 μm, preferably 15 to 25 μm.

The preferred glass fiber fabric of the carrier layer advantageously has the following properties:

The weight per unit area is from 30 to 120 g/m², preferably from 80 to 120 g/m².

The number of yarns in the longitudinal and transverse direction is, in each case, 5 to 50, preferably 10 to 20 yarns/cm, more preferably 15 yarns/cm.

The yarns used to form the glass fiber fabric have a titer of from 150 to 1000 dtex, preferably 200 to 500 dtex.

In accordance with a particularly preferred embodiment all three features are provided simultaneously.

Within the scope of this invention and also generally, fluorine-containing polymers both with exclusively carbon atoms and also those with heteroatoms in the main chain are referred to as fluoropolymers or fluorine-containing polymers. Representatives of the first group are homo- and copolymers of olefinically unsaturated fluorinated monomers.

The fluoropolymers resulting from these monomers are divided into the following categories: polytetrafluoroethylene, fluorothermoplastics, fluororubbers and the fluoroelastomers obtained therefrom by vulcanization. The most important representatives of the fluoropolymers with heteroatoms in the main chain are polyfluorosiloxanes and polyfluoroalkoxyphosphazenes.

The first film preferably contains one fluoropolymer or at least two fluoropolymers to an extent of 50 wt. %, more preferably 75 wt. %, particularly preferably 90 wt. %, very particularly preferably 95 wt. % (in each case in relation to the total composition of the first film).

The polymers forming the first film more preferably consist of one fluoropolymer or at least two fluoropolymers to an extent of 100 wt. %. The additives discussed later can additionally be added optionally to the fluoropolymers. Said additives are—as mentioned—not absolutely necessary, and also might not be used.

In particular, PTFE (polytetrafluoroethylene), ETFE (poly (ethylene-co-tetrafluoroethylene)), FEP (poly(tetrafluoro-ethylene-co-hexafluoropropylene)), PVDF (poly(1,1-difluoroethene)) or PFA (perfluoralkoxy polymers) or mixtures of two or more of the aforesaid fluoropolymers are suitable as fluoropolymers.

PTFE denotes fluoropolymers that are composed of tetrafluoroethene monomers.

ETFE is a fluorinated copolymer consisting of the monomers chlorotrifluoroethylene or tetrafluoroethylene and ethylene.

FEP, also referred to as fluorinated ethylene-propylene copolymer, denotes copolymers formed of tetrafluoroethene and hexafluoropropene.

PVDF denotes fluoropolymers producible from 1,1-difluoroethene (vinylidene fluoride). PFA denotes copolymers with groupings such as as basic units [poly(tetrafluoroethylene-co-perfluoroalkyl vinyl ether)]. PFAs result from the copolymerization of tetrafluoroethene and perfluoroalkoxy vinyl ethers (for example perfluoro vinyl propyl ether, n=3).

The fluoropolymers can be mixed with further polymers, wherein a good miscibility of the fluoropolymers with the other polymers must be provided.

Suitable polymers are olefin polymers such as homo- or copolymers of olefins such as ethylene, propylene or butylene (the term copolymer is to be understood here analogously to mean that it includes terpolymers), polypropylene homopolymers or polypropylene copolymers including block (impact) and random polymers.

Further polymers can be selected alone or in combination from the group of polyesters such as, in particular, polyethylene terephthalate (PET), polyamides, polyurethanes, polyoxymethylene, polyvinyl chloride (PVC), polyethylene naphthalate (PEN), ethylene vinyl alcohol (EVOH), polyvinylidene chloride (PVDC), polyvinylidene fluoride (PVDF), polyacrylonitrile (PAN), polycarbonate (PC), polyamide (PA), polyethersulfone (PES), polyimide (PI), polyarylene sulfides and/or polyarylene oxides.

The polymers for forming the first film can be present in pure form or in blends with additives such as antioxidants, light stabilizers, antiblocking agents, lubricants and processing aids, fillers, dyes, pigments, blowing agents or nucleation agents.

The first film preferably does not comprise any of the aforesaid additives.

In accordance with a preferred embodiment of the invention the second film likewise contains fluoropolymers within the above-mentioned limits (to an extent of up to 50 wt. %, more preferably up to 75 wt. %, particularly preferably up to 90 wt. %, very particularly preferably up to 95 wt. % of one fluoropolymer or at least two fluoropolymers (in each case in relation to the total composition of the second film).

The first and the second film also preferably have an identical composition based on fluoropolymers.

The second film can also consist of other polymers, for example polyolefins such as PE and PP or polyesters such as PET or polyimides or PA or PVC, or can consist of another of the above-mentioned polymers.

The polymers should be selected such that on the one hand the adhesive mass can be anchored well thereon and on the other hand the film is fixedly bonded by lamination with the glass fiber fabric coated with fluoropolymers.

The first and the second film are particularly advantageously laminated on the glass fiber fabric in order to form the carrier material.

The lamination process can be performed in such a way that either the films are hot-welded/fused to one another and thus bonded, or are bonded by means of a lamination adhesive.

If, for example, a PTFE film is laminated on a PTFE-coated glass fiber fabric, it is known that, for example, FEP can be used for the welding of PTFE. Other thermoplastically processible fluoropolymers (such as ETFE, ECTFE, PVDF, etc.) could also be used for this purpose, or laminating adhesives known to a person skilled in the art.

It must only be ensured that the lamination point does not tear under mechanical load.

In accordance with a preferred embodiment the first and/or the second film can consist of an at least two-layered laminate formed of two or more film layers. The outermost film layer of the first film, i.e. the film layer facing the material layers forming the body, is the film containing one fluoropolymer or at least two fluoropolymers.

In accordance with a preferred embodiment the thickness of the first and/or the second film is between 15 and 350 µm, preferably between 30 and 200 µm, more preferably between 50 and 150 µm.

Both films are preferably between 15 and 350 µm, more preferably between 30 and 200 µm thick.

In order to produce an adhesive tape from the carrier, all known adhesive mass systems can be used. Besides adhesive masses based on natural or synthetic rubbers, silicone adhesive masses and polyacrylate adhesive masses in particular can be used, preferably a low molecular weight acrylate hotmelt pressure-sensitive adhesive mass.

Adhesive masses based on acrylate or silicone are preferred.

The adhesive mass can be selected from the group of natural rubbers or synthetic rubbers or from any blend of natural rubbers and/or synthetic rubbers, wherein the natural rubber or the natural rubbers can be selected in principle from all obtainable qualities, such as crepe, RSS, ADS, TSR or CV types, depending on the required levels of purity and viscosity, and the synthetic rubber or the synthetic rubbers can be selected from the group of randomly copolymerized styrene-butadiene rubbers (SBR), butadiene rubbers (BR), synthetic polyisoprenes (IR), butyl rubbers (IIR), halogenated butyl rubbers (XIIR), acrylate rubbers (ACM), ethylene-vinyl acetate copolymers (EVA) and polyurethanes and/or blends thereof.

Thermoplastic elastomers can more preferably be added to the rubbers in a proportion by weight of from 10 to 50 wt. %, more specifically in relation to the total elastomer content, in order to improve the processability.

In particular, potential representatives at this juncture are the particularly compatible styrene-isoprene-styrene (SIS) and styrene-butadiene-styrene (SBS) types. Suitable elastomers for mixing are also, for example EPDM or EPM rubber, polyisobutylene, butyl rubber, ethylene vinyl acetate, hydrogenated block copolymers from dienes (for example by hydrogenation of SBR, cSBR, BAN, NBR, SBS, SIS or IR, such polymers being known for example as SEPS and SEBS) or acrylate copolymers such as ACM.

In addition, a 100% styrene-isoprene-styrene (SIS) system has proven to be suitable.

Crosslinking is advantageous in order to improve the removability of the adhesive tape after use and can be performed thermally or by irradiation with UV light or electron beams.

All previously known thermally activatable chemical crosslinkers, such as accelerated sulfur or sulfur donor systems, isocyanate systems, reactive melamine, formaldehyde and (optionally halogenated) phenol formaldehyde resins or reactive phenol resin or diisocyanate crosslinking systems with the corresponding activators, epoxidized polyester and acrylate resins, and combinations thereof can be used for the purpose of thermally induced chemical crosslinking.

The crosslinkers are preferably activated at temperatures above 50° C., in particular at temperatures of from 100° C. to 160° C., very particularly preferably at temperatures of from 110° C. to 140° C.

The crosslinkers can also be thermally excited by IR radiation or high-energy alternating fields.

Solvent-based or water-based adhesives masses or hot-melt systems can be used. A mass based on an acrylate hotmelt is also suitable, wherein this mass can have a K value of at least 20, in particular greater than 30, obtainable by concentrating a solution of a mass of this kind to form a system that can be processed as hotmelt.

The concentration can take place in suitably equipped boilers or extruders, and in particular a degassing extruder is preferred for the accompanying degassing.

An adhesive mass of this kind is presented in DE 43 13 008 A1, the content of which is hereby incorporated by reference and made part of this disclosure and invention.

The adhesive mass based on an acrylate hotmelt, however, can also be chemically crosslinked.

In a further embodiment copolymers of (meth)acrylic acid and esters thereof with 1 to 25 C atoms, maleic, fumaric and/or itaconic acid and/or esters thereof, substituted (meth) acrylamides, maleic acid anhydride and other vinyl compounds, such as vinyl esters, in particular vinyl acetate, vinyl alcohols and/or vinyl ethers are used as self-adhesive masses.

The residual solvent content should be less than 1 wt. %.

An adhesive mass which has also proven to be suitable is a low molecular weight acrylate melt pressure-sensitive adhesive compound as sold by BASF under the name ACRESIN® UV or ACRONAL®, in particular ACRONAL® DS 3458 or ACRESIN® A 260UV. This adhesive mass with low K value obtains its application-specific properties by a subsequent chemical crosslinking triggered by radiation.

It should lastly be mentioned that polyurethane-based adhesives are also suitable.

To optimize the properties, the self-adhesive mass used can be mixed with one or more additives, such as tackifiers (resins), plasticizers, fillers, pigments, UV absorbers, light stabilizers, anti-ageing agents, crosslinkers, crosslinking promoters or elastomers.

Tackifiers are, for example, hydrocarbon resins (for example from unsaturated $C_5$ or $C_7$ monomers), terpene phenol resins, terpene resins from raw materials such as α or β pinene, aromatic resins such as coumarone indene resins, or resins from styrene or α-methylstyrene such as colophonium and derived products thereof, such as disproportionated, dimerized or esterified resins, wherein glycols, glycerol or pentaerythritol can be used. Resins that are stable under ageing without olefin double bond, such as hydrogenated resins, are particularly suitable.

Express reference is made here to the presentation of the state of knowledge in the "Handbook of Pressure Sensitive Adhesive Technology" by Donatas Satas (van Nostrand, 1989).

Suitable fillers and pigments are, for example, carbon black, titanium dioxide, calcium carbonate, zinc carbonate, zinc oxide, silicates or silica.

Suitable plasticizers are, for example, aliphatic, cycloaliphatic and aromatic mineral oils, di- or polyesters of phthalic acid, trimellitic acid or adipic acid, liquid rubbers (for example nitrile or polyisoprene rubbers), liquid polymers formed of butene and/or isobutene, acrylic acid esters, polyvinyl ethers, liquid and soft resins based on the raw materials for adhesive resins, lanolin and other waxes or liquid silicones.

Crosslinking agents are, for example, phenol resins or halogenated phenol resins, melamine and formaldehyde resins. Suitable crosslinking promoters are, for example, maleimides, allyl esters such as triallyl cyanurate, multi-functional esters of acrylic and methacrylic acid.

The anchoring is usually strong enough that an adhesive tape of this kind can be unwound from a roll without difficulty, without the anchoring of the adhesive mass tearing and the adhesive mass being wound the other way round so to speak (the adhesive mass is then disposed on the rear side of the carrier). Furthermore, it is expected from most pressure-sensitive adhesive tapes that these can be detached again from the substrate, that is to say they can be removed again, leaving behind as little trace as possible. This means that the adhesive tape must not break adhesively between the carrier and adhesive mass.

In accordance with a preferred embodiment the mass application of the adhesive mass to the carrier material is between 10 and 200 g/m²; preferably between 20 and 100 g/m², particularly preferably between 30 and 75 g/m².

In particular, fiber material (such as GFRP (glass fiber reinforced plastic) CFRP (carbon fiber reinforced plastic) or prepreg material, etc.) is used for the material layers for forming the molded part.

Prepreg material denotes a semi-finished product consisting of endless fibers and an unhardened thermoset plastics matrix, which is used especially in lightweight construction. The endless fibers can be present as a pure unidirectional layer, as a woven fabric, or as a non-woven fabric.

In order to increase the adhesion between the adhesive mass and the carrier material, or between the release lacquer and carrier material, the carrier material can be subjected to a corona treatment in order to increase the surface energy.

The use of a primer layer between the film and adhesive mass is advantageous in order to improve the adhesion of the adhesive mass to the films and thus the residue-free removability after the application.

An etching of the films is also advantageous in order to anchor the adhesive mass.

Descriptions of the adhesive masses and primers usually used for adhesive tapes can be found for example in the "Handbook of Pressure Sensitive Adhesive Technology" by Donatas Satas (van Nostrand, 1989).

The adhesive mass applied to the carrier material is preferably a pressure-sensitive adhesive mass, that is to say an adhesive mass which allows a permanent connection to almost all adhesive surfaces, even under relatively weak contact pressure, and after use can be detached again from the adhesive surface in a manner leaving behind substantially no residue. A pressure-sensitive adhesive mass is permanently sticky at room temperature, that is to say has a sufficiently low viscosity and a high tack, such that it wets the surface of the particular adhesive surface even with low contact pressure. The bonding ability of the adhesive mass is based on its adhesive properties, and the removability is based on its cohesive properties.

The general term "adhesive tape" within the sense of this invention comprises all planar structures, such as films or film portions that extend in two dimensions, tapes with an extended length and limited width, tape portions and the like, and lastly also blanks or labels.

The adhesive tape can be produced both in the form of a roll, that is to say in the form of an Archimedes spiral rolled on itself, and covered on the adhesive mass side with release materials such as siliconized paper or siliconized film.

A lint-free material, such as a plastic film or a well glued, long-fibered paper is preferably suitable as release material.

The adhesive tapes in particular have run lengths of 1000 to 30000 m. The width of the rolls is usually selected to be 10, 15, 19, 25 and 30 mm.

By applying two films, between which the glass fiber fabric is disposed, micro tears, cracks or pinholes in the fluorine coating of the glass fiber fabric, which could lead to a failure of the adhesive tape, are prevented. There is no resin penetration into the fiber network of the glass fiber fabric, and there are also no infiltrations into the material at the edges.

The carrier material or the adhesive tape also does not fray when cut, on account of the embedding of the glass fiber fabric between two films.

A film-like carrier consisting completely or at least up to an extent of 50 wt. % of fluorinated polymer does not exhibit the above-described disadvantages of fraying. The rigidity of an adhesive tape of this kind is also much lower, and it therefore does not fit the mold well. The carrier material presents a certain ductility, which additionally helps with regard to the adaptation to the mold.

Furthermore, the internal strength of a carrier material of this kind is much higher, and therefore no splitting of carrier parts is observed, not even under larger applied forces.

Due to the above-mentioned advantages, the adhesive tape according to the invention can be used outstandingly in a method for molding a body in a mold, comprising the following steps:
  applying an adhesive tape to the inner side of a mold
  distributing the material layers forming the body over the adhesive tape
  curing the material layers
  removing the body from the mold The body is preferably a half blade of a wind turbine.

In accordance with a preferred variant of the method the inner side of the mold is provided with a release agent before the adhesive tape is applied.

The material layers are more preferably cured under vacuum.

The individual method steps are explained in greater detail for example in EP 2 388 131 A1.

The invention will be explained in greater detail hereinafter on the basis of an example, but without also being limited hereby in any way.

Softening Point

The softening point is understood to mean the temperature (or the temperature range) at which amorphous or partially crystalline polymers transition from the glassy, hard-elastic state into a soft state. The reduction of the hardness of corresponding materials at the softening point is evident for example in that a body placed on a material sample under load is pressed into the material when the softening point is reached. The softening point is, in principle, above the glass transition temperature but in most polymers it is significantly lower than the temperature at which they transition completely into the liquid state.

The softening point is measured in accordance with ASTM E28-99 (2009), which is known as the ring & ball.

EXAMPLE

50 $g/m^2$ silicone adhesive mass (for example DOW CORNING® Q2-7657)

carrier, consisting of a 60 μm thick glass fiber fabric, which is first coated by a dip-coating method with PTFE polymers, such that a thickness of the casing surrounding the fibers of approximately 30 μm is provided. A 30 μm thick CAST film formed of PTFE is then laminated on both sides.

activation of the carrier (by conventional etching method)

Counter Example

50 $g/m^2$ silicone adhesive mass (for example DOW CORNING® Q2-7406)

carrier, consisting of a 60 μm thick glass fiber fabric, which is first coated by a dip-coating method with PTFE polymers, such that a thickness of the casing surrounding the fibers of approximately 30 μm is provided.

activation of the carrier (by conventional etching method)

The adhesive tape according to the invention according to Example 1 can be detached from the substrate leaving behind practically no residue, even after a number of demolding steps, and demonstrated a good release effect over the entire period.

No penetration of the resin into the carrier was observed either.

In the case of the counter example, a splitting of the carrier in the z-direction was observed upon detachment of the tape, in other words the carrier split, leaving behind a partial layer of PTFE on the surface, which was difficult to remove. It was also clearly visible that resin had penetrated into the micro tears of the tape and had left behind dark marks, which then lead to the above-described problems, such as diminishing release effect.

The adhesive tapes are for this purpose glued into a mold provided with a conventional release agent, such as FREKOTE® NC 44 (a release agent containing a mixture of dibutyl ether and polydimethylsiloxane (PDMS), which is a mixture of fully methylated linear siloxane polymers with terminal trimethylsiloxate units) or ME 143 from Miller Stephenson (a solvent-based suspension of low molecular weight PTFE). In accordance with FIG. 1, a number of construction cycles are performed. The temperature during the curing is 100 to 110° C. The vacuum is 0.1 bar.

Up to ten construction cycles were simulated.

The method according to the invention will be explained in greater detail in an exemplary manner hereinafter on the basis of a number of figures, without limiting the invention to these embodiments.

BRIEF DESCRIPTION OF THE DRAWINGS

Figure 1:
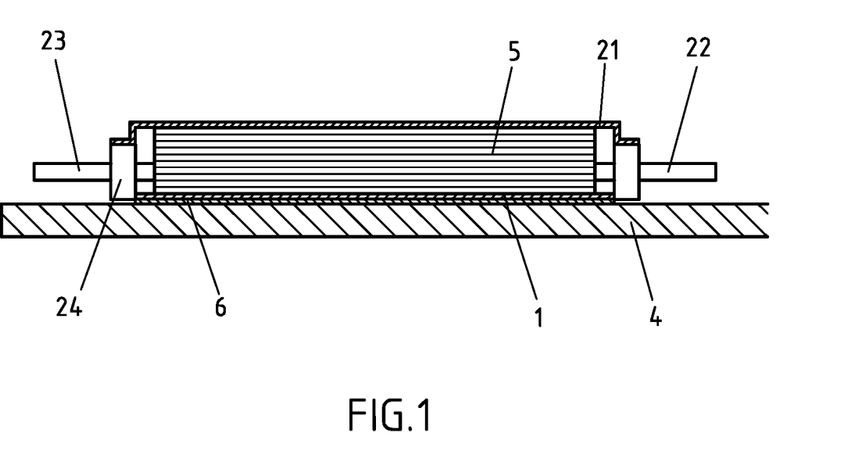
FIG. 1 shows the arrangement of the individual layers in the mold in a side view.
Figure 2:
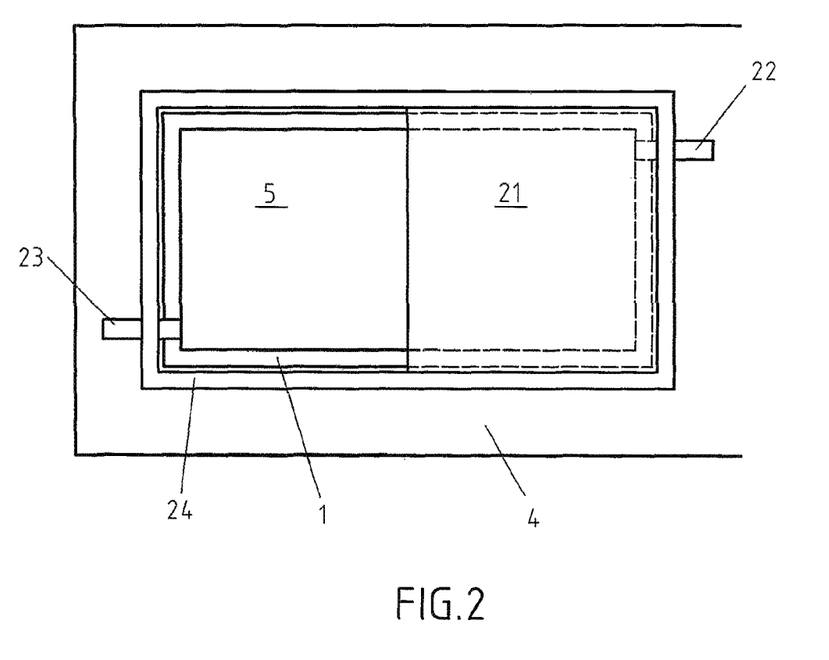
FIG. 2 shows the arrangement of the individual layers in the mold from above.

In the figures:

FIG. 2 shows the arrangement from above.

The mold 4 is provided with a very thin layer, a few µm thick, of a release agent 6, for example a solvent-based suspension of low molecular weight PTFE, the thickness of which is not shown in the correct ratio in FIG. 1. The release agent is applied using a rag. The suspension then dries, resulting in a very thin film. The adhesive tape 1 is then applied in a layer to the inner side of the mold 4.

Figure 3:
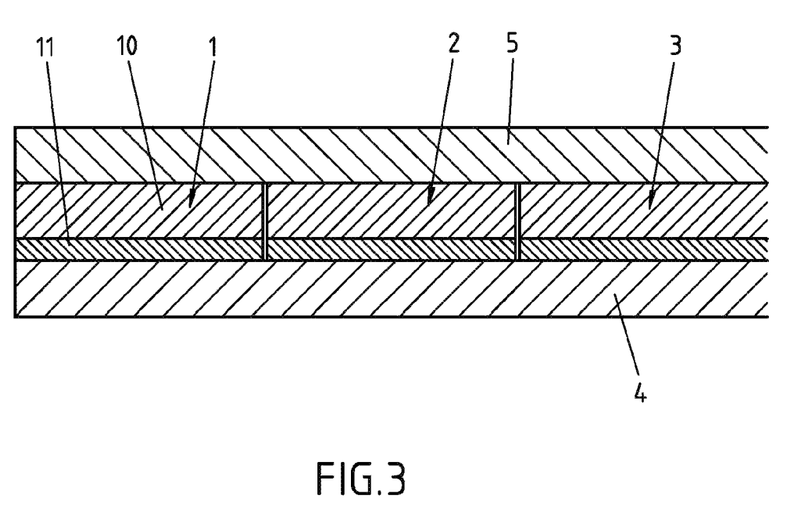
FIG. 3 shows a simplified detail from FIG. 1.

In FIG. 3 it is shown that the edges of the individual strips of the adhesive tape 1, 2, 3 lie edge to edge, in other words have no gaps. The individual adhesive tape portions 1, 2, 3 consist of a carrier layer 10, to which an adhesive mass layer 11, in particular a self-adhesive mass, is applied.

Following the gluing of the adhesive tape 1, the material layers 5 forming the body are distributed over the adhesive tape.

A sealing film 21 is then fixed over the material 5 with the aid of a second adhesive tape 24 so that a closed space is produced.

In FIG. 2 only half of the protective film 21 is shown. The protective film 21 is fixed on the mold 4 by the second adhesive tape 24.

The air is removed through a discharge point 22. The resin is fed to the material layers 5 by means of an access point 23, until these material layers are saturated.

The curing process is performed.

When this is complete, the sealing film 21 is removed and the finished molded body can be removed from the mold 4.

The invention claimed is:

1. A method comprising:
    applying an adhesive tape to an inner side of a mold;
    distributing at least one material layer over the adhesive tape;
    curing the at least one material layer, thereby forming a body; and
    removing the body from the mold,
    wherein:
    the adhesive tape comprises a self-adhesive mass and further comprises a carrier material comprising a textile;
    the textile comprises a top side, a bottom side, and at least one fiber comprising a coating;
    the at least one fiber has a softening point greater than or equal to 200° C.;
    the coating comprises at least one first fluoropolymer or at least one silicone polymer;
    a first film comprising at least one second fluoropolymer covers the whole of the top side; and
    a second film covers the whole of the bottom side.

2. The method as claimed in claim 1, wherein:
    the at least one second fluoropolymer is present at 50 wt. % relative to the total weight of the first film; or
    the first film consists of the at least one second fluoropolymer.

3. The method as claimed in claim 1, wherein the at least one first fluoropolymer is present and comprises a polytetrafluoroethylene (PTFE), a poly(ethylene-co-tetrafluoroethylene) (ETFE), a poly(tetrafluoroethylene-co-hexafluoropropylene) (FEP), a poly(1,1-difluoroethene) (PVDF), a perfluoralkoxy polymer (PFA), or a mixture thereof.

4. The method as claimed in claim 1, wherein the coating further comprises a homopolymer of ethylene, a copolymer of ethylene, a propylene, a butylene, a polyethylene terephthalate (PET), a polyamide, a polyurethane, a polyoxymethylene, a polyvinyl chloride (PVC), a polyethylene naphthalate (PEN), an ethylene vinyl alcohol (EVOH), a polyvinylidene chloride (PVDC), a polyvinylidene fluoride (PVDF), a polyacrylonitrile (PAN), a polycarbonate (PC), a polyamide (PA), a polyethersulfone (PES), a polyimide (PI), a polyarylene sulfide, or a polyarylene oxide.

5. The method as claimed in claim 1, wherein at least one of the first film and the second film is between 15 and 350 µm thick.

6. The method as claimed in claim 1, wherein the textile is a non-woven fabric.

7. The method as claimed in claim 1, wherein the at least one fiber comprises a carbon fiber or a glass fiber.

8. The method as claimed in claim 1, wherein the textile further comprises a glass fiber fabric.

9. The method as claimed in claim 1, wherein the self-adhesive mass is based on an acrylate or a silicone.

10. The method as claimed in claim 1, wherein the self-adhesive mass has a mass application between 10 and 200 g/m$^2$.

11. The method as claimed in claim 1, further comprising applying a release agent to the inner side before application of the adhesive tape.

12. The method as claimed in claim 1, wherein the at least one material layer is cured under a vacuum.

13. The method as claimed in claim 1, wherein the at least one second fluoropolymer comprises a polytetrafluoroethylene (PTFE), a poly(ethylene-co-tetrafluoroethylene) (ETFE), a poly(tetrafluoroethylene-co-hexafluoropropylene) (FEP), a poly(1,1-difluoroethene) (PVDF), a perfluoralkoxy polymer (PFA), or a mixture thereof.

14. The method as claimed in claim 1, wherein the first film further comprises a homopolymer of ethylene, a copolymer of ethylene, a propylene, a butylene, a polyethylene terephthalate (PET), a polyamide, a polyurethane, a polyoxymethylene, a polyvinyl chloride (PVC), a polyethylene naphthalate (PEN), an ethylene vinyl alcohol (EVOH), a polyvinylidene chloride (PVDC), a polyvinylidene fluoride (PVDF), a polyacrylonitrile (PAN), a polycarbonate (PC), a polyamide (PA), a polyethersulfone (PES), a polyimide (PI), a polyarylene sulfide, or a polyarylene oxide.

15. The method as claimed in claim 1, wherein the textile is a woven fabric.

16. The method as claimed in claim 11, wherein the release agent comprises a polyvinyl alcohol or a silicone wax.

17. The method as claimed in claim 11, wherein the release agent is based on a silane or a siloxane.

18. The method as claimed in claim 8, wherein the glass fiber fabric comprises a coating of at least one third fluoropolymer.

* * * * *